(12) United States Patent
Moriguchi

(10) Patent No.: US 9,887,452 B2
(45) Date of Patent: Feb. 6, 2018

(54) ARTIFICIAL SATELLITE WITH INTEGRATED ANTENNA

(71) Applicant: Tatsuji Moriguchi, Tokyo (JP)

(72) Inventor: Tatsuji Moriguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 243 days.

(21) Appl. No.: 14/353,543

(22) PCT Filed: Oct. 31, 2012

(86) PCT No.: PCT/JP2012/078134
§ 371 (c)(1),
(2) Date: Apr. 23, 2014

(87) PCT Pub. No.: WO2013/065722
PCT Pub. Date: May 10, 2013

(65) Prior Publication Data
US 2014/0292594 A1    Oct. 2, 2014

(30) Foreign Application Priority Data

Nov. 1, 2011  (JP) ................. 2011-240400

(51) Int. Cl.
| | | |
|---|---|---|
| H01Q 19/12 | (2006.01) | |
| H01Q 1/28 | (2006.01) | |
| B64G 1/66 | (2006.01) | |
| B64G 1/22 | (2006.01) | |
| B64G 1/50 | (2006.01) | |

(52) U.S. Cl.
CPC .............. *H01Q 1/288* (2013.01); *B64G 1/222* (2013.01); *B64G 1/66* (2013.01); *H01Q 19/12* (2013.01); *B64G 1/50* (2013.01)

(58) Field of Classification Search
CPC .. B64G 1/50; B64G 1/222; B64G 1/66; H01C 1/288; H01C 19/12; H01Q 1/288; H01Q 19/12
See application file for complete search history.

(56) References Cited

U.S. PATENT DOCUMENTS

| | | |
|---|---|---|
| 4,465,951 A | 8/1984 | Dalby |
| 4,684,952 A | 8/1987 | Munson et al. |
| 4,887,091 A * | 12/1989 | Yamada ............... H01Q 1/1235 343/714 |
| 5,936,587 A | 8/1999 | Gudilev et al. |

(Continued)

FOREIGN PATENT DOCUMENTS

| | | |
|---|---|---|
| FR | 2374754 A1 | 7/1978 |
| JP | 59-78709 U | 5/1984 |

(Continued)

OTHER PUBLICATIONS

Extended European Search Report of EP Application No. 12845914.6 dated May 26, 2015.
Russian Office Action for RU Application No. 2014121203 dated Oct. 29, 2015 with English Translation.
International Search Report for PCT Application No. PCT/JP2012/078134, dated Feb. 12, 2013.

(Continued)

*Primary Examiner* — Graham Smith
*Assistant Examiner* — Noel Maldonado

(57) ABSTRACT

An artificial satellite includes at least one hatch formed in a wall of the artificial satellite coming in contact with dead space of the artificial satellite, and a hatch opening and closing mechanism which opens the hatch, and the antenna is attached to the hatch.

4 Claims, 5 Drawing Sheets

(56) References Cited

U.S. PATENT DOCUMENTS

| | | | | |
|---|---|---|---|---|
| 6,019,475 | A | * | 2/2000 | Lynam .................. B60R 1/0602 |
| | | | | 359/604 |
| 8,482,610 | B2 | * | 7/2013 | do Carmo |
| | | | | Miranda .............. B64G 1/1021 |
| | | | | 348/144 |
| 8,674,893 | B2 | * | 3/2014 | Ecclestone ............. H01Q 1/002 |
| | | | | 343/753 |
| 8,731,468 | B2 | | 5/2014 | Durand et al. |
| 2007/0115191 | A1 | | 5/2007 | Hashiguchi et al. |

FOREIGN PATENT DOCUMENTS

| | | |
|---|---|---|
| JP | 59-91018 U | 6/1984 |
| JP | H04-275705 A | 10/1992 |
| JP | 2003-276699 A | 10/2003 |
| JP | 2004-297260 A | 10/2004 |
| JP | 2009-190661 A | 8/2009 |
| JP | 4639141 B2 | 2/2011 |
| RU | 2178604 C2 | 1/2002 |
| RU | 104387 U1 | 5/2011 |
| WO | 1992/001952 A1 | 2/1992 |
| WO | 2012/082957 A1 | 6/2012 |

OTHER PUBLICATIONS ussian Office Action for RU Application No. 2014121203/11 dated Sep. 6, 2016 with English Translation.
Australian Office Action for AU Application No. 2016202486 dated Jun. 7, 2017.

* cited by examiner

ARTIFICIAL SATELLITE WITH INTEGRATED ANTENNA

This application is a National Stage Entry of PCT/JP2012/078134 filed on Oct. 31, 2012, which claims priority from Japanese Application 2011-240400 filed on Nov. 1, 2011, the contents of all of which are incorporated herein by reference, in their entirety.

TECHNICAL FIELD

The present invention relates to an artificial satellite with an integrated antenna which is launched with the antenna stored in a main body of the satellite.

BACKGROUND ART

An artificial satellite includes a bus portion on which a bus device or the like used for orbit control of the satellite itself is mounted, a payload unit in which a mission device unit responsible for a mission function of the satellite is contained, and the like. Also, an electronic device such as a communication apparatus, an antenna, or a measurement device is included in the mission device unit.

In such an artificial satellite, miniaturization of the satellite itself is desired. However, since the antenna mounted on the artificial satellite is large, a method of mounting this antenna is important to miniaturization of the artificial satellite.

For example, an artificial satellite including a payload unit 101 and a bus portion 102 as illustrated in FIG. 5 is disclosed in Japanese Unexamined Patent Application, First Publication No. 2003-276699. A width of one side of this payload unit 101 is formed to be smaller than that of the bus portion 102. Accordingly, the payload unit 101 has a shape which is formed to concave with respect to the bus portion 102, and an antenna 105 is mounted in this concave place. Thus, the artificial satellite is miniaturized by forming the concave part of the payload unit 101.

DOCUMENTS OF THE PRIOR ART

Patent Document

[Patent Document 1] Japanese Unexamined Patent Application, First Publication No. 2003-276699

DISCLOSURE OF INVENTION

Problems to be Solved by the Invention

There is a problem associated with the artificial satellite in Japanese Unexamined Patent Application, First Publication No. 2003-276699 in that sufficient miniaturization is not achieved since the antenna 105 is provided outside the device (toward cosmic space).

In other words, when a mounting space for the antenna 105 is secured by hollowing the payload unit 101, it is assumed that the payload unit 10 can be made small. However, the payload unit is usually formed to have a required minimum size, and in order to reduce the size of the payload unit for the purpose of mounting the antenna, the amount of mission device units or the like contained in the payload unit must be reduced. As a result, the purpose of the artificial satellite may be limited.

Therefore, one object of the present invention is to provide an artificial satellite with an integrated antenna which is miniaturized while satisfying the purpose or the function of the artificial satellite.

Means for Solving the Problem

In order to solve the above problems, an artificial satellite of the present invention is characterized in that the artificial satellite includes at least one hatch provided in a wall which forms an empty space (dead space) inside the artificial satellite; and a hatch opening and closing mechanism which opens this hatch, wherein the antenna is attached to the hatch.

Effects of the Invention

According to the artificial satellite of the present invention, since the antenna is contained in a dead space inside the artificial satellite, it is possible to miniaturize the artificial satellite without reducing the size of the payload unit for mounting the antenna.

DESCRIPTION OF EMBODIMENTS

One embodiment of the present invention will be described. Further, in the description of in this embodiment, while an example of a dead space present in an artificial satellite includes a dead space in a payload unit, the present invention is not limited to such a dead space.

Figure 1:
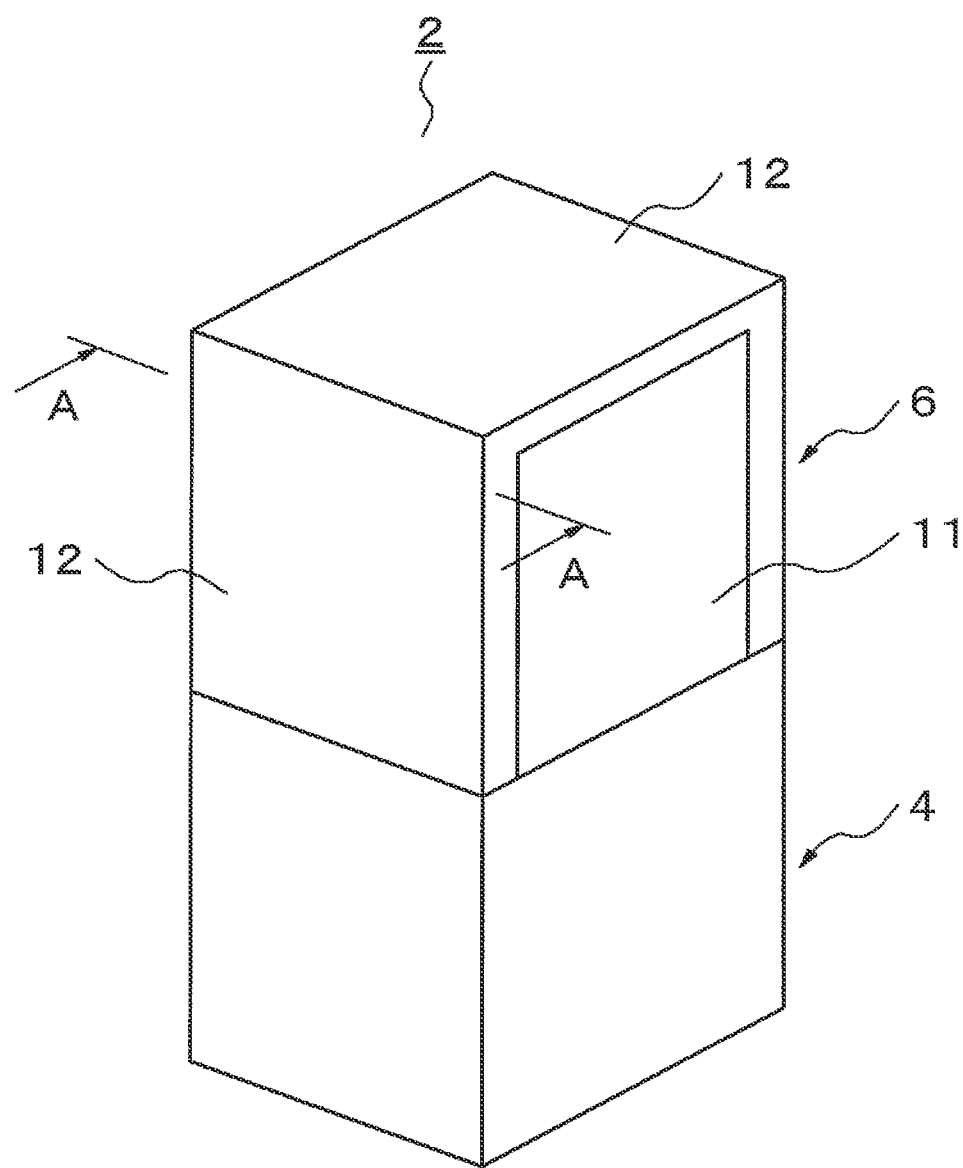
FIG. 1 is a schematic perspective view of an artificial satellite in an embodiment according to the present invention.
Figure 2:
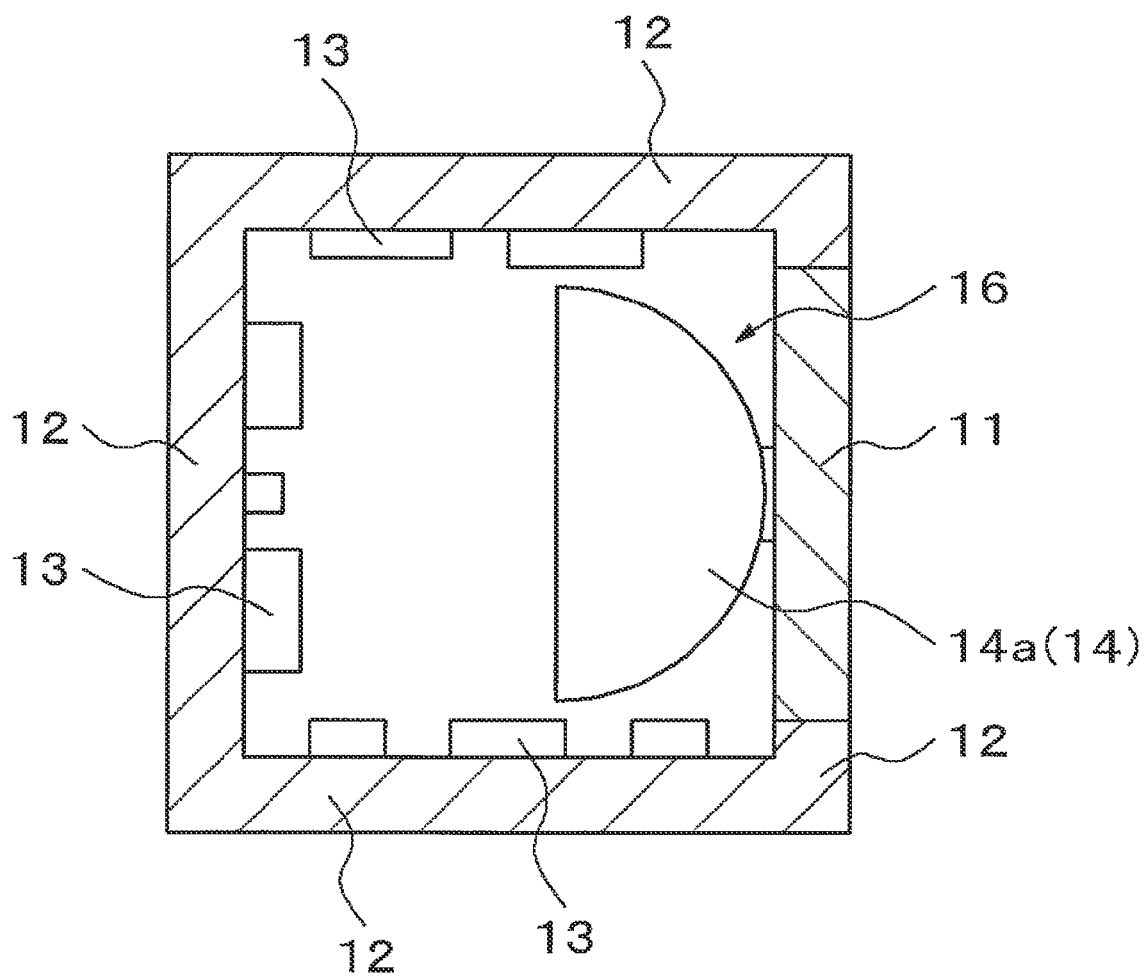
FIG. 2 is a cross-sectional view taken along a line A-A in the artificial satellite of FIG. 1.
Figure 3:
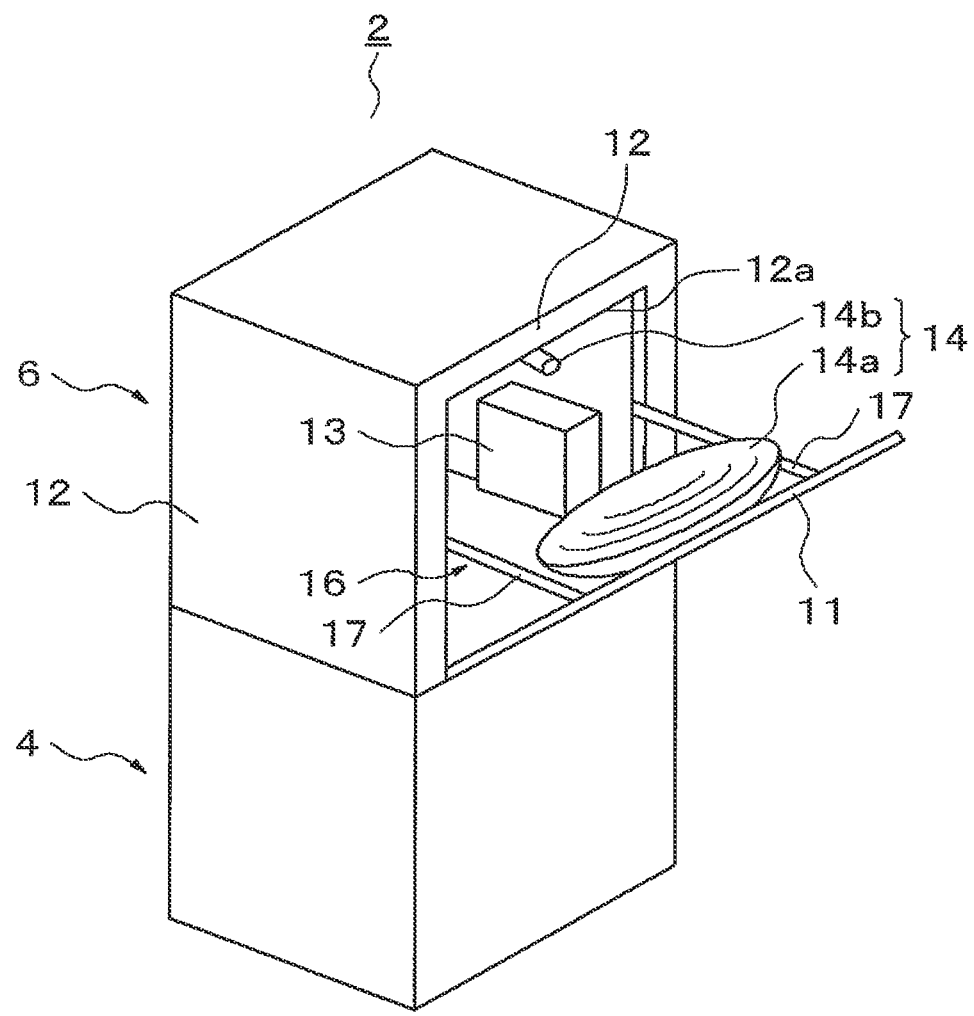
FIG. 3 is a perspective view in the artificial satellite in a state in which a hatch is opened.

FIG. 1 is a schematic perspective view of an artificial satellite 2 according to the present invention. FIG. 2 illustrates a cross-sectional view taken along a line A-A in the artificial satellite 2 of FIG. 1. FIG. 3 is a perspective view illustrating a state in which a hatch 11 of the artificial satellite 2 is opened.

The artificial satellite 2 includes a bus portion 4 in which a bus device used for orbit correction or the like is contained, and a payload unit 6 in which a mission device unit 13, an antenna 14, and the like is contained, as a main configuration. Further, while a case in which the artificial satellite 2 has a rectangular exterior will be described in this embodiment, the present invention is not limited to this shape. Further, while a case in which the artificial satellite and an earth station communicate will be described in the following description, the present invention is not limited to such a use. While the artificial satellite has a variety of configurations, the bus device is not mentioned in the description of the artificial satellite of the present invention.

The payload unit 6 includes a substantially rectangular housing, and a mission device unit 13 is contained in an internal space of the payload unit 6. Hereinafter, the internal space of the payload unit 6 is referred to as a payload room 16, and a housing wall on the payload room 16 side is referred to as an inner wall surface. Further, a hatch 11 is provided in a payload room wall 12. The hatch 11 can be opened or closed by a hatch opening and closing mechanism 17.

Various measurement devices, communication devices, control devices, the antenna 14, the hatch opening and closing mechanism 17 and the like are included in the mission device unit 13.

Generally, the mission device unit 13 has a temperature range which is optimal for operation, but the mission device unit 13 generates heat when operating and the temperature thereof rises. Therefore, the heat of the mission device unit 13 must be dissipated. Since the artificial satellite 2 flies through cosmic space, the heat of the mission device unit 13 is mainly dissipated by thermal radiation.

Therefore, in order to efficiently radiate the heat of the mission device unit 13 into cosmic space, a material wall used to promote heat dissipation, such as an OSR (optical solar reflector), is arranged in an outer wall (a wall surface on the cosmic space side) in the housing of the payload unit 6. Also, the mission device unit 13 is installed near an inner wall surface of the housing of the payload unit 6 so that the heat of the mission device unit 13 is easily transferred to the outer wall.

Further, the heat emitted by the mission device unit 13 is dissipated substantially isotropically. Therefore, when a plurality of mission device units 13 are densely arranged, there is a disadvantage in that the temperatures of the mission device units 13 rise due to heat from the other adjacent mission device units. Accordingly, the mission device units 13 are located near the wall and installed to be spaced so as not to cause thermal interference with the adjacent mission device units 13. Accordingly, it is necessary for the inner wall surface of the housing of the payload unit 6 to have an area corresponding to the installed mission device unit 13. Also, when the number of mission device units 13 increases, it is necessary for the inner wall of the housing to have a great area. As a result, an empty space is formed in a central room portion of the payload room 16.

In this artificial satellite 2, arrangement of a fuel tank or the like is performed to effectively use such dead space. However, since the fuel tank can be moved to and arranged in the bus portion 4 according to advances in technology for miniaturization of an engine, miniaturization of the fuel tank, or the like, the dead space in the payload room 16 continues to increase.

If the payload room 16 is small, the dead space can be small. However, since it is necessary for the inner wall of the payload unit 6 to have a predetermined size in order to install the mission device unit 13 or the like as described above, the size of the payload unit 6 cannot be optionally reduced even when the payload room 16 has much dead space.

On the other hand, since the antenna performs transmission or reception of signals through cosmic space, it is necessary for the antenna to be located outside the satellite at the time of communication. However, the antenna is not arranged outside the satellite at the time of launching of the artificial satellite 2. When the antenna is arranged outside the satellite at the time of launching, a protection means used to protect the antenna from shock during the launch is necessary, and therefore, it is desirable for the antenna not to be arranged outside the satellite at the time of launching.

Therefore, in the artificial satellite according to the present invention, production of much dead space in the payload room 16 is noted, the payload room 16 is used as a chamber used to store the antenna 14 at the time of launching, and the antenna 14 is taken outside of the satellite at the time of communication. Therefore, the openable or closable hatch 11 is provided in the housing of the payload unit 6, and the antenna 14 is attached to this hatch 11. Also, when the antenna 14 is used, the antenna 14 can be drawn outside the satellite by opening the hatch 11.

Such an antenna 14 includes a reflector 14*a* used to reflect electric waves such as microwaves, and a radiator 14*b* which inputs or outputs the electric waves. Also, at the time of reception, the reflector 14*a* reflects the electric waves so that the electric waves are input to the radiator 14*b*. Further, at the time of transmission, the reflector 14*a* reflects the electric waves emitted from the radiator 14*b* toward a target. In the following description, an example of the antenna 14 is a fixed antenna. However, when transmission frequency decreases, the antenna 14 becomes larger. In such a case, a deployable antenna may be used.

The hatch 11 is provided in the sidewall 12 of the housing of the payload unit 6 and is opened or closed by the hatch opening and closing mechanism 17. While the case in which the hatch 11 is provided in one sidewall 12 has been shown in FIG. 1 or the like, the hatches 11 may be provided in a plurality of sidewalls 12. A plurality of antennas 14 can be provided by providing a plurality of hatches 11. Therefore, there is the advantage in that the number of posture control processes used to adjust the direction of the antenna 14 with respect to a communication partner decreases.

The hatch opening and closing mechanism 17 opens the hatch 11 based on a hatch opening command from the ground or the like, or automatically opens the hatch 11 according to a previously set program. Further, after the artificial satellite 2 assumes an orbit and the antenna 14 is installed outside the satellite, the antenna 14 is not contained. Therefore, the hatch opening and closing mechanism 17 may be configured to open the hatch using, for example, a spring.

Also, the reflector 14*a* is attached to the wall of the hatch 11 on the payload room 16 side, as illustrated in FIG. 3. Further, the radiator 14*b* is attached to an upper end portion 12*a* of the payload room 16. Therefore, when the hatch 11 is opened, the reflector 14*a* is installed outside the satellite. Also, when the hatch 11 is opened, the degree of opening of the hatch 11 is set so that the radiator 14*b* is located in a focus position of the reflector 14*a*.

When such an artificial satellite 2 is launched, the antenna 14 is contained in the payload room 16, the hatch 11 is closed, and then the artificial satellite 2 is launched. Also, when the artificial satellite 2 assumes a predetermined orbit, the hatch 11 is opened by the hatch opening and closing mechanism 17. Accordingly, the antenna 14 springs out of the satellite and becomes able to perform communication.

As described above, it is not necessary to reduce the area of the inner wall in which the mission device unit 13 is arranged in close proximity to other units since the artificial satellite is launched with the antenna 14 stored in the dead space of the payload room 16. In other words, it is possible to miniaturize the artificial satellite 2 while satisfying the purpose and the function of the artificial satellite.

Figure 4:
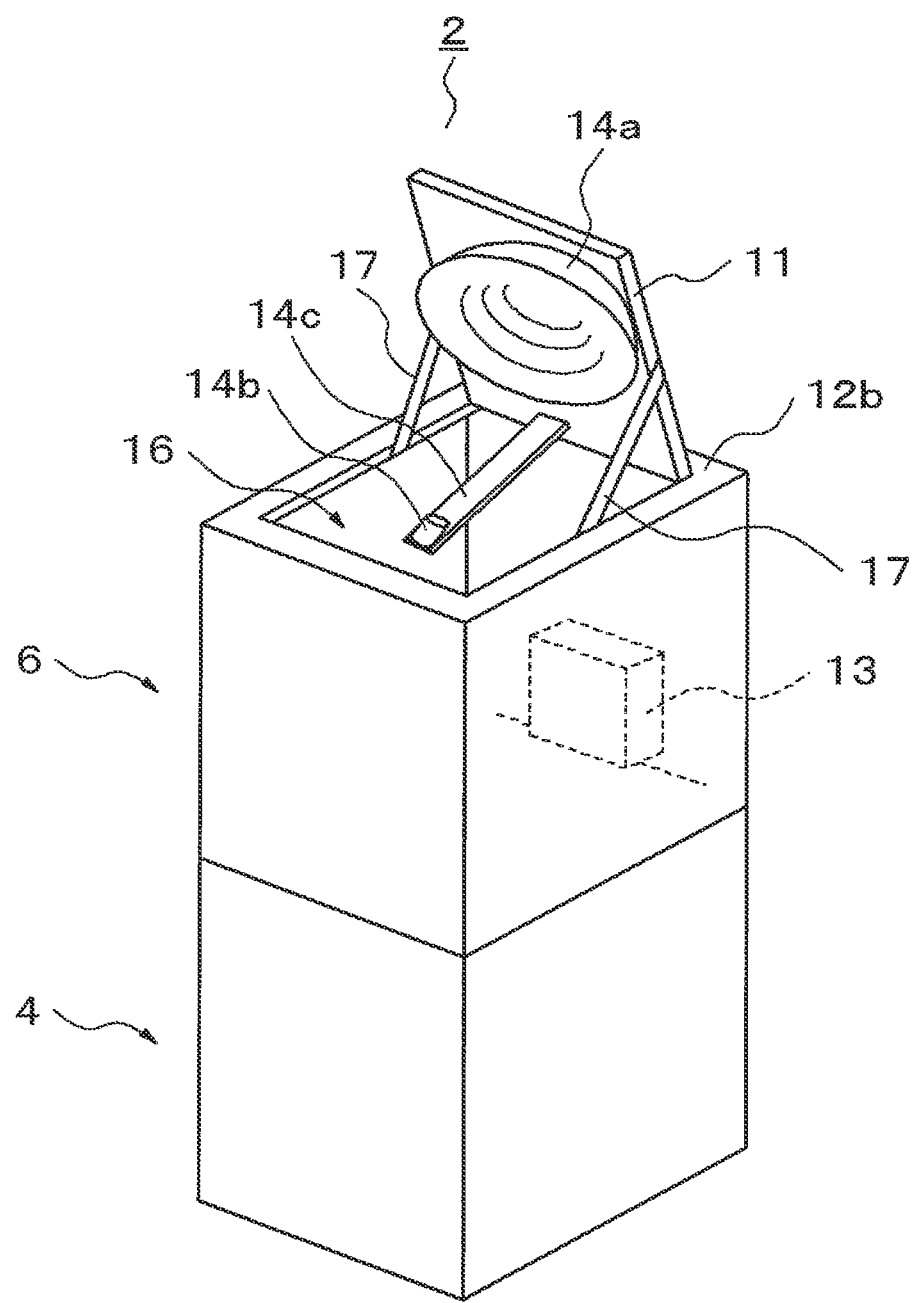
FIG. 4 is a perspective view of the artificial satellite when the hatch is provided in a ceiling wall of a payload unit.
Figure 5:
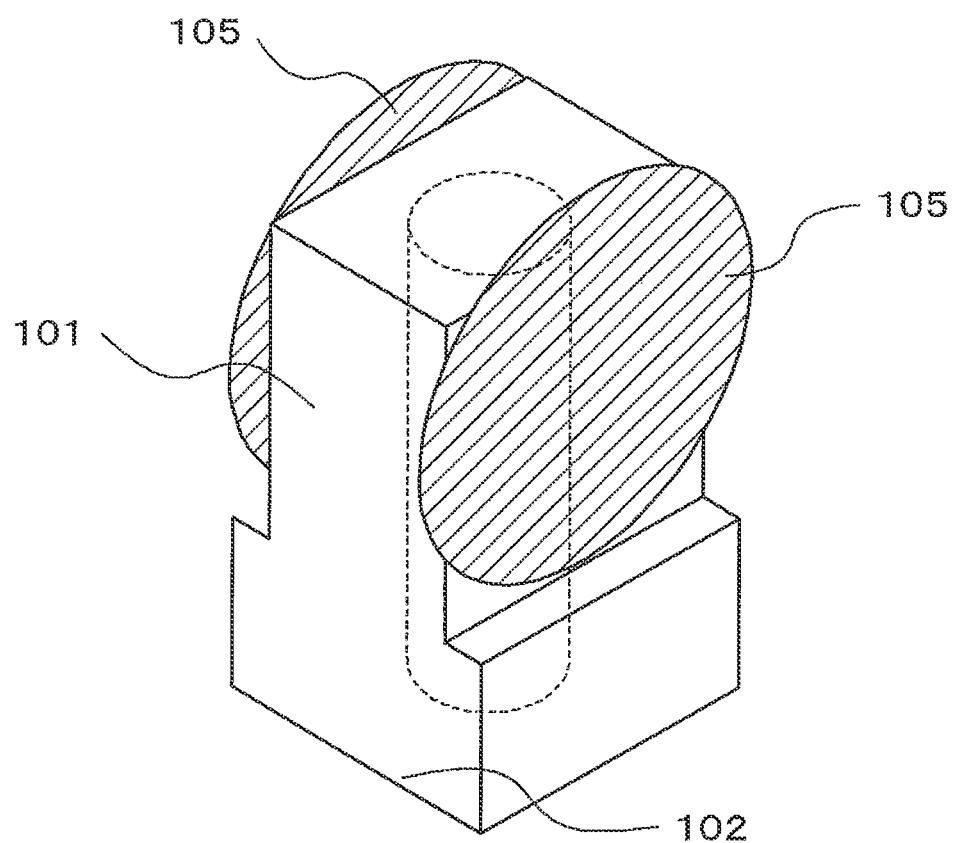
FIG. 5 is a perspective view of an artificial satellite applied to the description of related art.

Further, although the case in which the hatch 11 is provided in the sidewall 12 of the payload room 16 has been described in the above description, the hatch 11 may be provided in the ceiling wall 12*b* of the payload room 16, as illustrated in FIG. 4.

Further, while the relative position of the reflector 14*a* and the radiator 14*b* is adjusted based on the opening or closing degree of the hatch 11, the reflector 14*a* and the radiator 14*b* may be attached to the hatch 11 together, as illustrated in FIG. 4. In this case, the radiator 14*b* is fixed to the hatch 11 via an arm 14c. Therefore, the relative position between the reflector 14a and the radiator 14b can be mechanically determined.

Further, the direction of the antenna 14 can be adjusted according to an output direction or a reception direction of the electric waves without performing posture control of the artificial satellite 2 by making the hatch opening and closing mechanism 17 controllable. In other words, the direction of the antenna 14 can be adjusted by adjusting the opening degree of the hatch 11 according to the output direction or the reception direction of the electric waves. Therefore, high quality communication can be realized.

Priority is claimed on Japanese Patent Application No. 2011-240400, filed Nov. 1, 2011, the content of which is incorporated herein by reference.

INDUSTRIAL APPLICABILITY

According to the artificial satellite in accordance with the present invention, it is possible to miniaturize the artificial satellite without impairing the purpose and the function of the artificial satellite.

DESCRIPTION OF REFERENCE SYMBOLS 2 artificial satellite
4 bus portion
6 payload unit
11 hatch
12 sidewall (payload room wall)
12a upper end portion
12b ceiling wall
13 mission device unit
14 antenna
14a reflector
14b radiator
14c arm
16 payload room

What is claimed is:

1. An artificial satellite comprising:
a plurality of first walls which partition a dead space of the artificial satellite, the plurality of first walls comprising a hatch, respectively;
a plurality of second walls which partition the dead space of the artificial satellite, the plurality of second walls being substantially perpendicular to the plurality of first walls, respectively;
a plurality of reflectors which are respectively attached to hatches, the plurality of reflectors being configured to reflect electric waves;
a plurality of radiators which are respectively provided on the plurality of second walls, the plurality of radiators being configured to receive or emit the electric waves; and
a plurality of hatch opening and closing mechanisms which open the hatches, respectively,
wherein a relative position of each of the plurality of reflectors with respect to the plurality of radiators is changed depending on an opening degree or a closing degree of the hatch.

2. The artificial satellite according to claim 1, wherein each of the plurality of first walls is one from among a ceiling wall and a sidewall of a payload unit in which a mission device unit which executes a mission function of the artificial satellite is contained.

3. The artificial satellite according to claim 1, wherein the plurality of hatch opening and closing mechanisms open the hatches by a predetermined amount, respectively.

4. The artificial satellite according to claim 1, wherein the plurality of hatch opening and closing mechanisms adjust the opening degree or the closing degree of the hatches, respectively.

* * * * *